United States Patent
Koshiba

(10) Patent No.: US 6,751,201 B1
(45) Date of Patent: Jun. 15, 2004

(54) DATA EXCHANGE SYSTEM AND METHOD OF DATA EXCHANGE

(75) Inventor: Norihisa Koshiba, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/049,964

(22) Filed: Mar. 27, 1998

(30) Foreign Application Priority Data

Mar. 27, 1997 (JP) .............................................. 9-074860

(51) Int. Cl.[7] .............................................. H04B 7/005
(52) U.S. Cl. ...................................................... 370/278
(58) Field of Search ................................. 370/379, 359, 370/357, 412, 417, 220, 375, 255, 384, 370, 372, 386–390, 395, 400, 264–266; 379/219, 242; 711/100, 170; 345/502, 508; 709/201, 237

(56) References Cited

U.S. PATENT DOCUMENTS

| | | | | |
|---|---|---|---|---|
| 4,096,568 A | * | 6/1978 | Bennett et al. .............. | 711/206 |
| 4,156,906 A | * | 5/1979 | Ryan .......................... | 711/128 |
| 4,236,251 A | * | 11/1980 | Ohgishi et al. .............. | 455/180 |
| 4,491,944 A | * | 1/1985 | Caizergues et al. ......... | 370/387 |
| 4,520,477 A | * | 5/1985 | Wen ............................ | 370/370 |
| 4,670,788 A | * | 6/1987 | Ozaki ......................... | 348/671 |
| 4,991,168 A | * | 2/1991 | Richards ..................... | 370/381 |
| 5,295,253 A | * | 3/1994 | Ducousso et al. ........... | 711/207 |
| 5,309,432 A | * | 5/1994 | Kanakia ...................... | 370/412 |
| 5,434,857 A | | 7/1995 | Mori | |
| 5,519,701 A | * | 5/1996 | Colmant et al. ............. | 370/412 |
| 5,530,924 A | * | 6/1996 | Miller ...................... | 455/186.1 |
| 5,649,146 A | * | 7/1997 | Riou .......................... | 711/217 |
| 5,802,052 A | * | 9/1998 | Venkataraman ............. | 370/395 |
| 5,943,242 A | * | 8/1999 | Vorbach et al. ............... | 716/17 |

FOREIGN PATENT DOCUMENTS

| | | |
|---|---|---|
| EP | 0 414 950 A1 | 8/1989 |
| WO | WO 96/28946 | 9/1996 |

OTHER PUBLICATIONS

European Search Report dated Oct. 6, 2003.

Japanese Office Action issued Dec. 19, 2000 in a related application with English–language translation of relevant portions.

"Digital Telephone Exchange," Minoru Akiyama, Kazuhiko Itsushima, and Seihiko Shimazaki, Sangyo Tosho Kabushiki Kaisha (Industrial Publications Company, Limited), pp. 21–22, Section dealing with the Message Exchange System, Published in Apr., 1986.

Japanese Office Action issued Dec. 7, 1999 in a related application and English translation of relevant portions.

* cited by examiner

*Primary Examiner*—Chi Pham
*Assistant Examiner*—Prenell Jones
(74) *Attorney, Agent, or Firm*—Dickstein, Shapiro, Morin & Oshinsky, LLP.

(57) ABSTRACT

A data exchange system for use in a base station of a mobile communication system includes a plurality of control circuits, a plurality of memories each respectively associated with one of the control circuits, an exchange information transfer circuit for transmitting exchange (destination) information to each one of the control circuits, an addressing circuit for providing each of the control circuits a designation about an area in an associated memory in which the data is to be written in accordance with the exchange information, and a reading circuit for reading out data written from the designated area in the associated memory. Each memory area is associated with a possible data destination, so designating the storage area for memory data effectively switches the data to the intended destination. This makes it possible to eliminate a line exchange circuit which is required in a conventional data exchange system and which is a major factor in determining the size of the system. This permits the data exchange to be smaller than in conventional systems.

60 Claims, 12 Drawing Sheets

DATA EXCHANGE SYSTEM AND METHOD OF DATA EXCHANGE

BACKGROUND OF THE INVENTION

1. Field of the Invention

The invention relates to a data exchange system, and more particularly to a data exchange system to be used for a mobile communication base station applicable to high traffic. The invention relates further to a method of data exchange.

2. Description of the Related Art

A mobile communication base station is generally designed to have a plurality of central processing units (CPUs) for processing subscriber data to thereby conform to high traffic. A relation among the number of subscriber's loops M, subscriber data processing capability per a single central processing unit L, and the number of central processing units N is represented by the following equation.

$$M = L \times N$$

A generally used data exchange system is explained hereinbelow with reference to FIG. 1 which is a block diagram of a mobile communication base station including a generally used data exchange system.

First, data flow from a subscriber to public network is explained hereinbelow. As illustrated in FIG. 1, the m number of data about subscriber's loop is transmitted from a subscriber radio interface circuit 61 to each of n CPUs 1-i (i=1 to n). Data received 1-i is processed in each of n CPUs and then transmitted to a parallel/serial (P/S) converting circuit 63 as parallel data PDTi (i=1 to n). The parallel data is converted into the m number of serial data SDATj (j=1 to m) by the P/S converting circuit 63, and then, is line-exchanged in a line exchange circuit 64. The thus line-exchanged serial data SDATj' (j=1 to m) is output to public lines 65 through a public network interface circuit 62.

Data flow from public network to a subscriber is just opposite to the above-mentioned steps. The detail is omitted.

Hereinbelow is explained the function of a section encompassed with a broken line in FIG. 1 and including the P/S converting circuit 63 and the line exchange circuit 64. Herein, suppose that data is transmitted from a subscriber toward public network. Parallel data PDTi (i=1 to n) transmitted from a subscriber through a plurality of CPUs 1-1 to 1-n is in a row, "D11–17", "D21–27", - - - , "DL1–L7", "D'11–17", - - - , as illustrated in FIG. 2. The parallel data PDTi is temporarily stored in a buffer formed in the P/S converting circuit 63, and then, is transmitted from the circuit 63 as the M number of serial data SDAT i1–iL wherein M=N×L.

The thus transmitted SDAT i1–iL is line-exchanged to a desired line by the line exchange circuit 64. The thus line-exchanged M number of serial data is transmitted to the public network interface circuit 62, and then, to the public lines 65 through the public network interface circuit 62. Herein, SDAT i1 to SDAT nL indicates the totally M number of data.

The structure of a first conventional data exchange system is explained hereinbelow with reference to FIG. 3.

As illustrated in FIG. 3, the first conventional data exchange system is comprised of the P/S exchange circuit 63 and the line exchange circuit 64. The P/S exchange circuit 63 includes a large-size dual port RAM 631 for storing therein data having been processed in the n CPUs 1-1 to 1-n, a parallel/serial (P/S) converting section 632, a timing generating circuit 633, and a bus arbitrating circuit 634 for arbitrating a bus from the n CPUs. The line exchange circuit 64 includes a switching circuit 641, and an exchange information transfer circuit 642. Parts or elements corresponding to those in FIG. 1 have been provided with the same reference numerals.

The dual port RAM 631 includes the m number of storage areas in which parallel data transmitted from the n number of CPUs 1-1 to 1-n is to be stored, and further includes ports each of which faces the n number of CPUs and the P/S converting section 632. Data is stored (or written) into or taken (or read) out of the dual port RAM 631 through the ports. The dual port RAM 631 is in communication with all of the n number of CPUs 1-1 to 1-n through a common data bus DBUS, and receives addresses ADD from all of the n number of CPUs 1-1 to 1-n.

The P/S converting section 632 converts parallel data PDT received from the dual port RAM 631, into serial data at a timing defined by a timing signal TIM transmitted from the timing generating circuit 633. The P/S converting section 632 transmits parallel address PAD to the dual port RAM 631.

The timing generating circuit 633 produces timing signals TIM at a certain interval, and transmits it to the P/S converting section 632 for converting parallel data into serial data.

The switching circuit 641 connects serial data received therein to a designated public line in accordance with exchange information XC transmitted from the exchange information transfer circuit 642.

The exchange information transfer circuit 642 receives the exchange information XC from an upstream system (not illustrated), and transmits the exchange information XC to the switching circuit 641 at a predetermined timing.

The bus arbitrating circuit 634 arbitrates requests transmitted from the n number of CPUs 1-1 to 1-n for storing parallel data therein, and prevents data collision on a bus. Specifically, the bus arbitrating circuit 634 receives requests RQ1–RQn for occupying a bus from the n number of CPUs 1-1 to 1-n, and transmits an allowance AK1–AKn to use a bus.

Hereinbelow is explained an operation of the first conventional data exchange system illustrated in FIG. 3, with reference to FIG. 4 which is a time chart illustrating an operation of the first conventional data exchange system. Each of the n number of CPUs 1-1 to 1-n, when having processed data, transmits the request RQ1–RQn for occupying the data bus DBUS of the dual port RAM 631, to the bus arbitrating circuit 634. The bus arbitrating circuit 634 having received those requests RQ1–RQn for occupying the data bus DBUS of the dual port RAM 631 transmits the allowance AK1–AKn to each of the CPUs in an order at which the requests RQ1–RQn have been received. Only CPU which received the allowance can transmit the processed data to the dual port RAM 631 through the data bus DBUS. The thus transmitted, processed data is stored in the dual port RAM 631. The data having been stored in the dual port RAM 631 is taken out of the dual port RAM 631 as the parallel data PDT by the P/S converting section 632 in synchronization with the timing signals TIM transmitted from the timing generating circuit 633 for every one of the m number of lines in accordance with the parallel address PAD transmitted from the P/S converting section 632. The thus taken-out parallel data PDT is converted into serial data in the P/S converting section 632. The m number of data having been converted into serial data in the P/S converting section 632 is line-exchanged in the switching circuit 641 in accordance with the exchange information XC transmitted from the exchange information transfer circuit 642 and indicating where the data is transferred to. The thus line-exchanged data is transmitted to the public network interface circuit 62 as serial data SDAT1' to SDATm'.

The switching circuit 641 carries out switch between input and output lines in such a manner as illustrated in FIG. 5. Specifically, the switching circuit 641 converts data D1, D2 and Dm received therein through input lines, into data D1', D2' and Dm' to be output through output lines. As illustrated in FIG. 5, data D1', D2' and Dm' correspond to data Dm, D1 and D2, respectively.

FIG. 6 illustrates a second conventional data exchange system, including the P/S exchange circuit 63 and the line exchange circuit 64. The illustrated data exchange system is different from the first conventional data exchange system illustrated in FIG. 3 in that it includes data buffers 2-1 to 2-n in the same number as that of the CPUs 1-1 to 1-n, in place of the dual port RAM 631 and the bus arbitrating circuit 634. The data buffers 2-1 to 2-n are associated with the CPUs 1-1 to 1-n one to one. Similarly to the first conventional data exchange system illustrated in FIG. 3, the second conventional data exchange system illustrated in FIG. 6 is comprised of the P/S exchange circuit 63 and the line exchange circuit 64, wherein the P/S exchange circuit 63 includes, a parallel/serial (P/S) converting section 632, and a timing generating circuit 633, as well as the data buffers 2-1 to 2-n, and the line exchange circuit 64 includes a switching circuit 641, and an exchange information transfer circuit 642. Each of the CPUs 1-1 to 1-n is connected to an associated data buffer through a data bus DBUS1–DBUSn, and transmits an address ADD1–ADDn to an associated data buffer. Each of the data buffers 2-1 to 2-n transmits parallel data PDT1–PDTn to the P/S converting section 632.

Each of the data buffers 2-1 to 2-n temporarily stores parallel data transmitted from an associated CPU, and acts as a memory for making it possible to conform to a timing designated by the P/S converting section 632.

Hereinbelow is explained an operation of the second conventional data exchange system, with reference to FIG. 7 which is a time chart illustrating the operation.

Each of the n number of CPUs 1-1 to 1-n, when having finished processing data, stores the thus processed data in an associated data buffer 2-1 to 2-n through an associated data bus DBUS1–DBUSn, designating an address with an address bus ADD1–ADDn. The thus stored parallel data PDT1–PDTn is transmitted to the P/S converting section 632 for every one of the m number of lines in synchronization with timing signals TIM transmitted from the timing generating circuit 633, and then converted into serial data by the P/S converting section 632.

The thus converted m number of serial data is line-exchanged in the switching circuit 641 in accordance with the exchange information XC transmitted from the exchange information transfer circuit 642 and indicating where the serial data is transferred to. The switching circuit 641 carries out switching in such a manner as illustrated in FIG. 5. Specifically, the switching circuit 641 converts data SDAT1, SDAT2 and SDATm received therein, into data SDAT1', SDAT2' and SDATm'. As illustrated in FIG. 5, data SDAT1', SDAT2' and SDATm' correspond to data SDATm, SDAT1 and SDAT2, respectively. Thus, the serial data SDAT1' to SDATm' is transmitted to the public lines from the switching circuit 641.

The above-mentioned conventional data exchange systems are accompanied with the following problems.

First, the first conventional data exchange system illustrated in FIG. 3 does not independently use a data bus for each of the CPUs 1-1 to 1-n when the processed data is transferred from each of the CPUs 1-1 to 1-n to the dual port RAM 631. Hence, the data is transferred to the dual port RAM 631 in time-sharing manner for each of the CPUs 1-1 to 1-n. This causes a problem that it would take much time to transfer data from each of the CPUs 1-1 to 1-n to the dual port RAM 631, as data is increased in an amount, namely, the number of CPUs is increased.

In addition, the first conventional data exchange system needs the bus arbitrating circuit 634 as a dedicated circuit, which causes a problem that the data exchange system cannot avoid becoming larger in size.

Furthermore, since the first conventional data exchange system includes the switching circuit 641 for line-exchange, the data exchange system would become larger in size as the number of lines is increased.

The second conventional data exchange system illustrated in FIG. 6 independently uses the data buffer 2-1 to 2-n for each of the CPUs 1-1 to 1-n. Hence, time loss is not generated for data transfer in the data exchange system. However, the data buffer might be increased in size in dependence on capability per CPU for processing subscribers' data, which is accompanied with a problem that the second conventional data exchange system illustrated in FIG. 6 is also increased in size.

It may be considered that a dual port RAM is substituted for the data buffer. However, in such a case, each of the CPUs has to be connected to the P/S converting circuit through an address line. Namely, the data exchange system is required to include the n number of address lines similar to the parallel address PAD illustrated in FIG. 3. This increases the number of signals, which causes the data exchange system to have a more complex structure.

Furthermore, since the second conventional data exchange system includes the switching circuit 641 for line-exchange similarly to the first conventional data exchange system, the second conventional data exchange system would become larger in size as the number of lines is increased.

Japanese Unexamined Patent Publications Nos. 4-252345 and 6-54022 have suggested apparatuses and methods for transferring data through a dual port RAM. However, the above-mentioned problems in the first and second conventional data exchange systems cannot be solved by those apparatuses and methods.

SUMMARY OF THE INVENTION

In view of the foregoing problems of the conventional data exchange systems, it is an object of the present invention to provide a data exchange system which can be fabricated in a smaller size than the conventional ones. Specifically, it is an object of the present invention to provide a data exchange system including no line exchange circuit which is a major factor for causing a data exchange system to become larger in size. It is also an object of the present invention to provide a method of data exchange providing the same advantages as those of the above-mentioned inventive data exchange system.

In one aspect of the present invention, there is provided a data exchange system including (a) a plurality of control circuits, (b) a plurality of memories each of which stores data transmitted from an associated control circuit, (c) a designator for providing each of the memories a designation about an area in an associated memory in which the data is to be written, and (d) a reader for reading out data written in the designated area in the associated memory.

The data exchange system may further include an exchange information transfer circuit for transmitting exchange information to each one of the control circuits, the data being written into an area in an associated memory in accordance with the exchange information There is further provided a data exchange system including (a) a plurality of control circuits, (b) a plurality of memories each of which stores data transmitted from an associated control circuit, (c) an exchange information transfer circuit for transmitting exchange information to each one of the control circuits, (d) a timing pulse generating circuit for providing each of the memories a designation about an area into which the data is to be written, and (e) a reading circuit for reading out data written in the thus designated area in the associated memory.

The data exchange system preferably includes the memories in the same number as that of the control circuits in such a manner that the memories are associated with the control circuits one to one. It is preferable that each one of the memories has R storage areas where R is a positive integer equal to or greater than 2, and wherein the designator or timing pulse generating circuit designates the R storage areas one by one as an area in which the data is to be written. It is also preferable that each of the R storage areas comprises a plurality of sections. Each of the R storage areas preferably has the sections in the same number as that of lines to which the data transmitted from the control circuits is to be transmitted.

It is preferable that each one of the memories comprises a dual port random access memory (RAM) having first and second ports, data transmitted from the control circuits being written into the memories through the first port, and the thus written-into data being read out by the reader or reading circuit through the second port. For instance, the first port may be designed as a serial port, and the second port as a parallel port. There may be used a central processing unit (CPU) as the control circuit.

It is preferable that the designator or timing pulse generating circuit is designed to transmit selection signals to the memories to thereby monitor access from the control circuits to the memories. For instance, the designator or timing pulse generating circuit may be designed to monitor at a certain interval which one of the first and second storage areas of the memories each of the control circuits makes access to, and transmits selection signals based on monitoring results so that the reader or reading circuit can read out the data written in one of the first and second storage areas.

It is preferable that the reader or reading circuit includes a parallel/serial converting circuit for converting parallel data transmitted from the memories to serial data, and an address counter for transmitting a load pulse to the parallel/serial converting circuit and an address to the memories. It is preferable that all of the memories are in communication with the parallel/serial converting circuit through a common bus.

It is preferable that the designator or timing pulse generating circuit includes (a) address decoders in the same number of the control circuits, each of the address decoders decoding an address an associated control circuit made access to, (b) access point latches in association with the address decoders, each of the access point latches storing therein a result of decoding made by an associated address decoder, and (c) a selection signal generating circuit for transmitting selection signals to the memories, based on the result stored in each one of the access point latches. Each of the access point latches preferably includes (a) at least one flip-flop having a first input terminal fixed at a high level, a second input terminal receiving a decode output transmitted from an associated address decoder, and an output terminal for transmitting an output in accordance with the decode output, (b) a plurality of bit latches for latching the output transmitted from the flip-flop, (c) at least one selector receiving outputs transmitted from the bit latches and transmitting a single output, and (d) a bit selector for latching the output transmitted from the selector. The access point latches may include the bit latches in the same number as the number of areas into which each one of the memories is divided. For instance, the number is two.

The data exchange system may further include an inverter for inverting a signal, and wherein a first bit latch is activated when receiving a signal, and a second bit latch is activated when receiving an inverted signal inverted by the inverter.

In another aspect of the present invention, there is provided a method of data exchange, including the steps of (a) designating each one of control circuits an area into which data is to be written, (b) storing data transmitted from one of the control circuits, in the thus designated area in one of memories, and (c) reading out the data stored in the designated area in the one of memories.

It is preferable in the method that each one of the memories is in association with each one of the control circuits, and the data transmitted from one of the control circuits is stored in the designated area in an associated memory. It is preferable that each one of the memories has first and second storage areas, and that the method further include the step of alternately designating the first and second storage areas as an area in which the data is to be written. It is preferable that each of the first and second storage areas comprises a plurality of sections, and that the method further include the step of designating at least one of the sections for the data to be written thereinto. It is also preferable that each one of the memories has R storage areas where R is a positive integer equal to or greater than 2, and that the method further includes the step of designating the R storage areas one by one as an area in which the data is to be written. It is also preferable that each of the R storage areas has a plurality of sections, and that the method further include the step of designating at least one of the sections for the data to be written thereinto.

The method may further include the step of providing exchange information to each one of the control circuits, the data being written into the designated area in the one of memories in accordance with the exchange information.

The method may further include the step of monitoring access from the control circuits to the memories.

The method may further include the step of converting parallel data transmitted from the memories to serial data, in which case it is preferable that the parallel data is transmitted from all of the memories through a common bus.

The method may further include the steps of monitoring at a certain interval which one of the first and second storage areas of the memories each of the control circuits makes access to, and transmitting selection signals based on monitoring results so that the data written in one of the first and second storage areas can be read out. For instance, the first storage area may be selected by receiving a first signal, and the second storage area may be selected by receiving a second signal which is an inverted signal of the first signal.

It is preferable that the above-mentioned step (a) further includes (a-1) decoding an address each one of the control circuit made access to, (a-2) storing therein a result of decoding carried out in the step (a-1), and (a-3) transmitting selection signals to the memories, based on the result of decoding.

In brief, the data exchange system in accordance with the present invention includes a plurality of memories in association with each one of control circuits or CPUs. A signal is transmitted to each one of control circuits or CPUs in accordance with exchange information to thereby designate an area into which data is to be written. Then, data written into the designated area is read out. This structure makes it possible to eliminate a line exchange circuit to thereby decrease the data exchange system in size.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Figure 1:
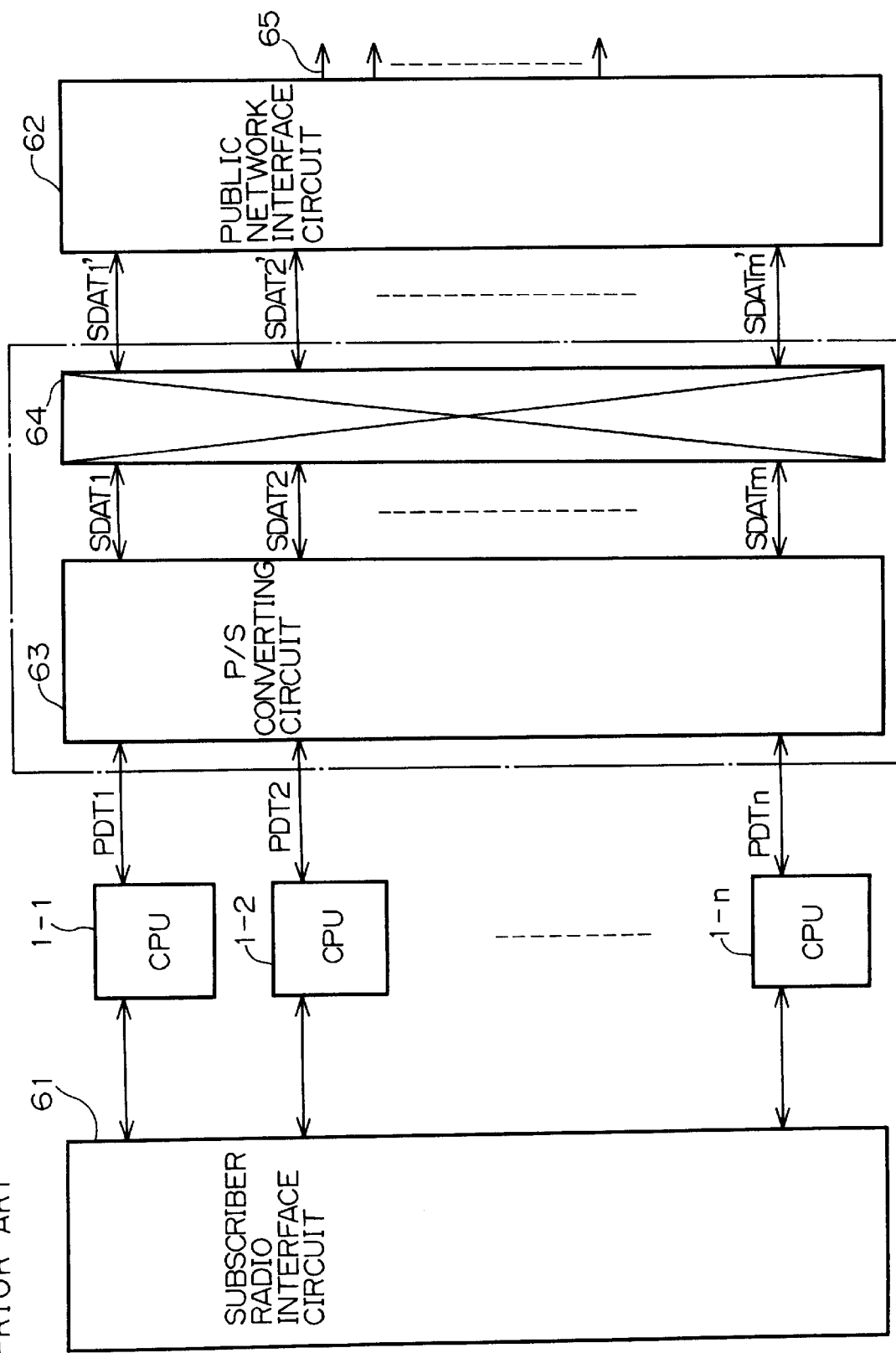
FIG. 1 is a block diagram of a mobile communication base station including a generally used data exchange system.
Figure 2:
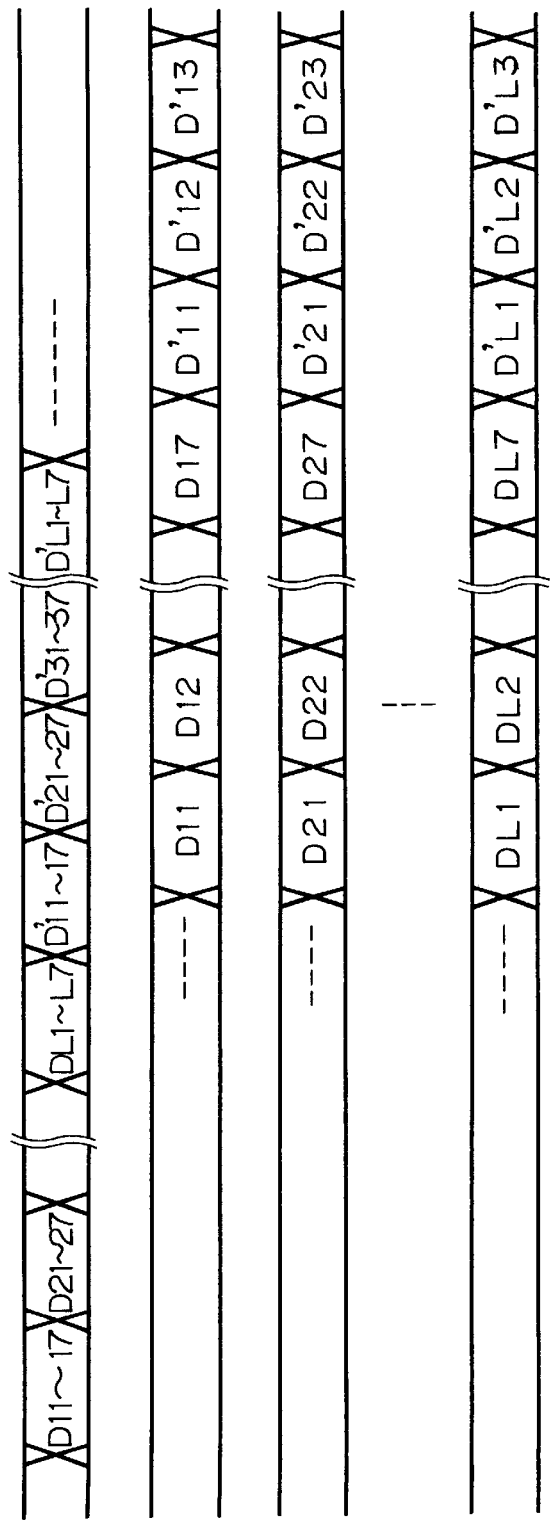
FIG. 2 is a time chart illustrating an operation of the data exchange system illustrated in FIG. 1.
Figure 3:
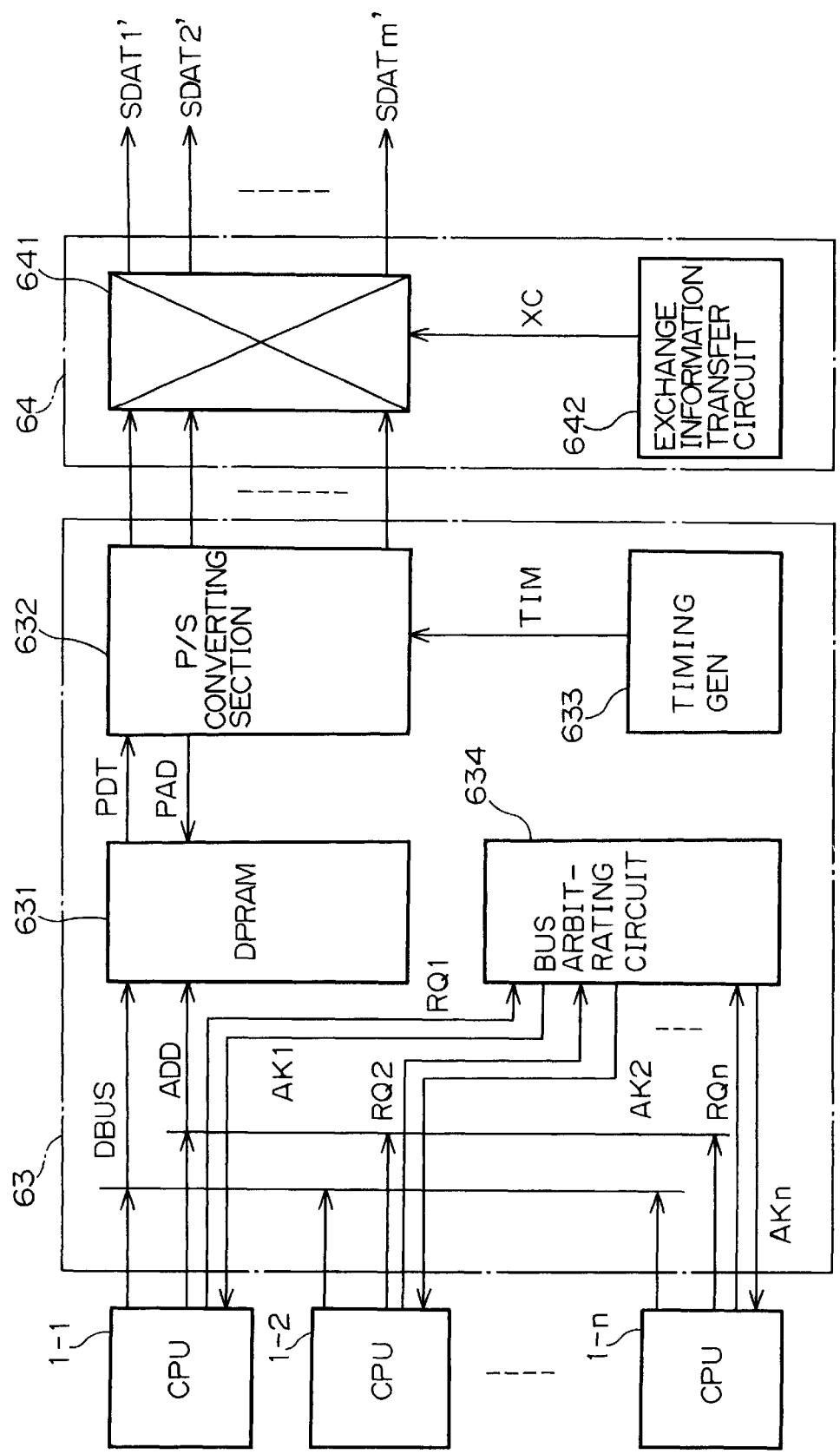
FIG. 3 is a block diagram of a first conventional data exchange system.
Figure 4:
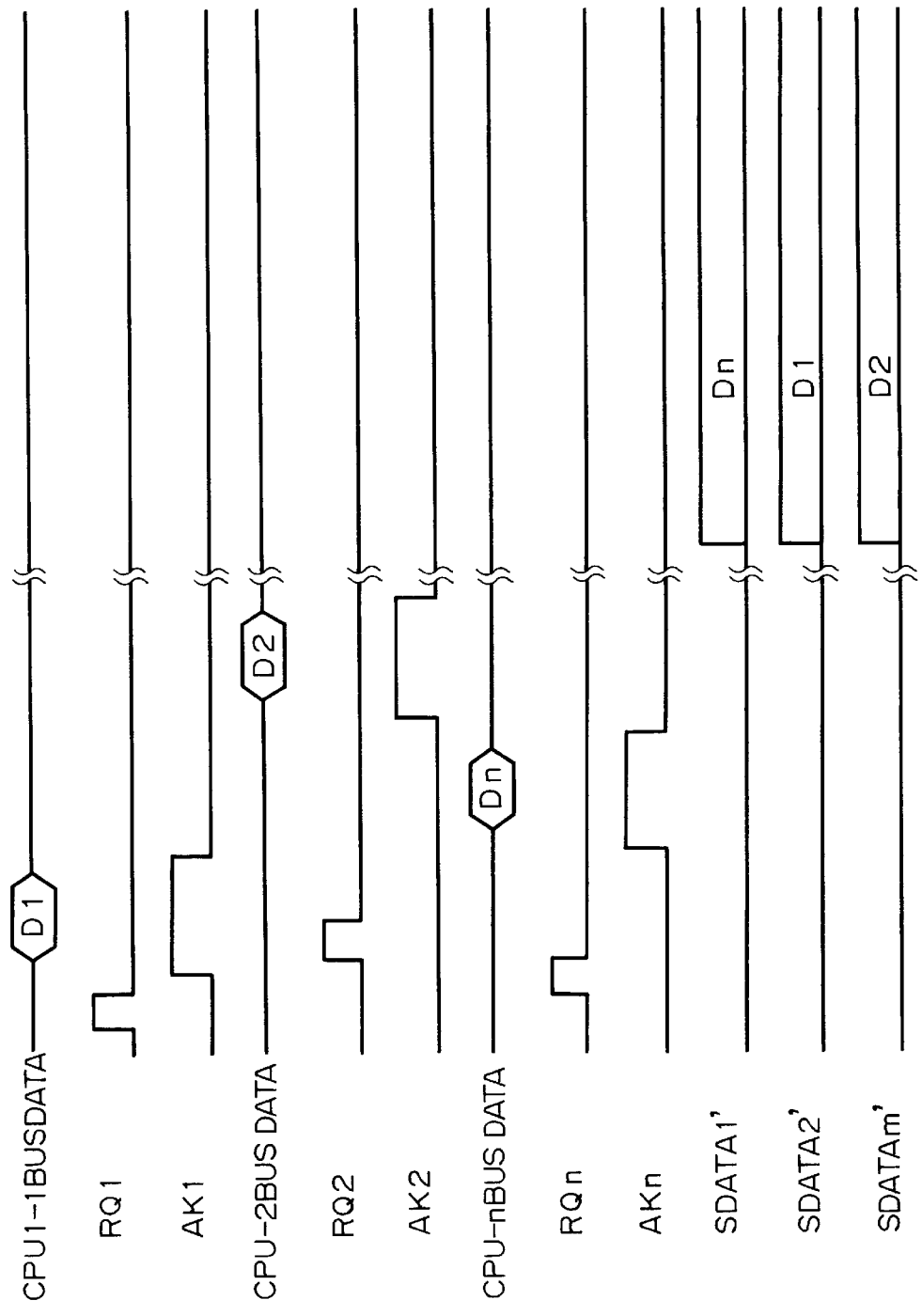
FIG. 4 is a time chart illustrating an operation of the first conventional data exchange system illustrated in FIG. 3.
Figure 5:
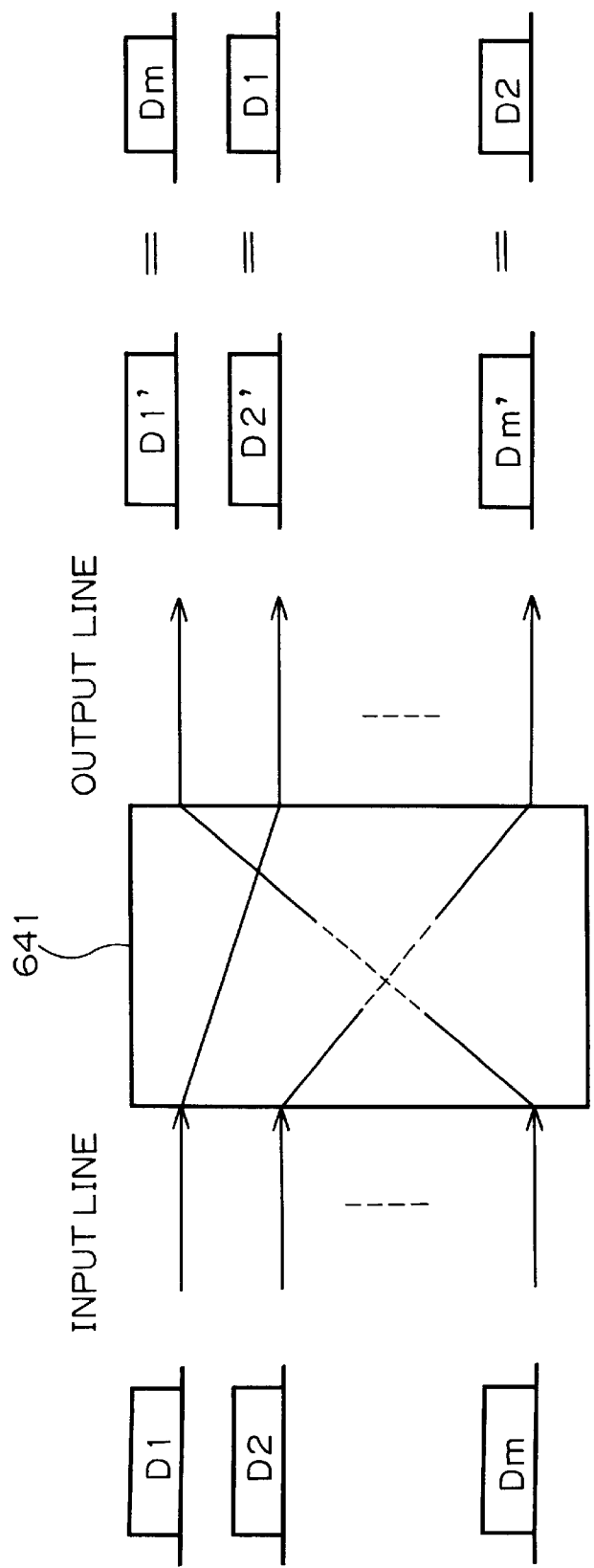
FIG. 5 illustrates an example of data exchange to be carried out by a switching circuit.
Figure 6:
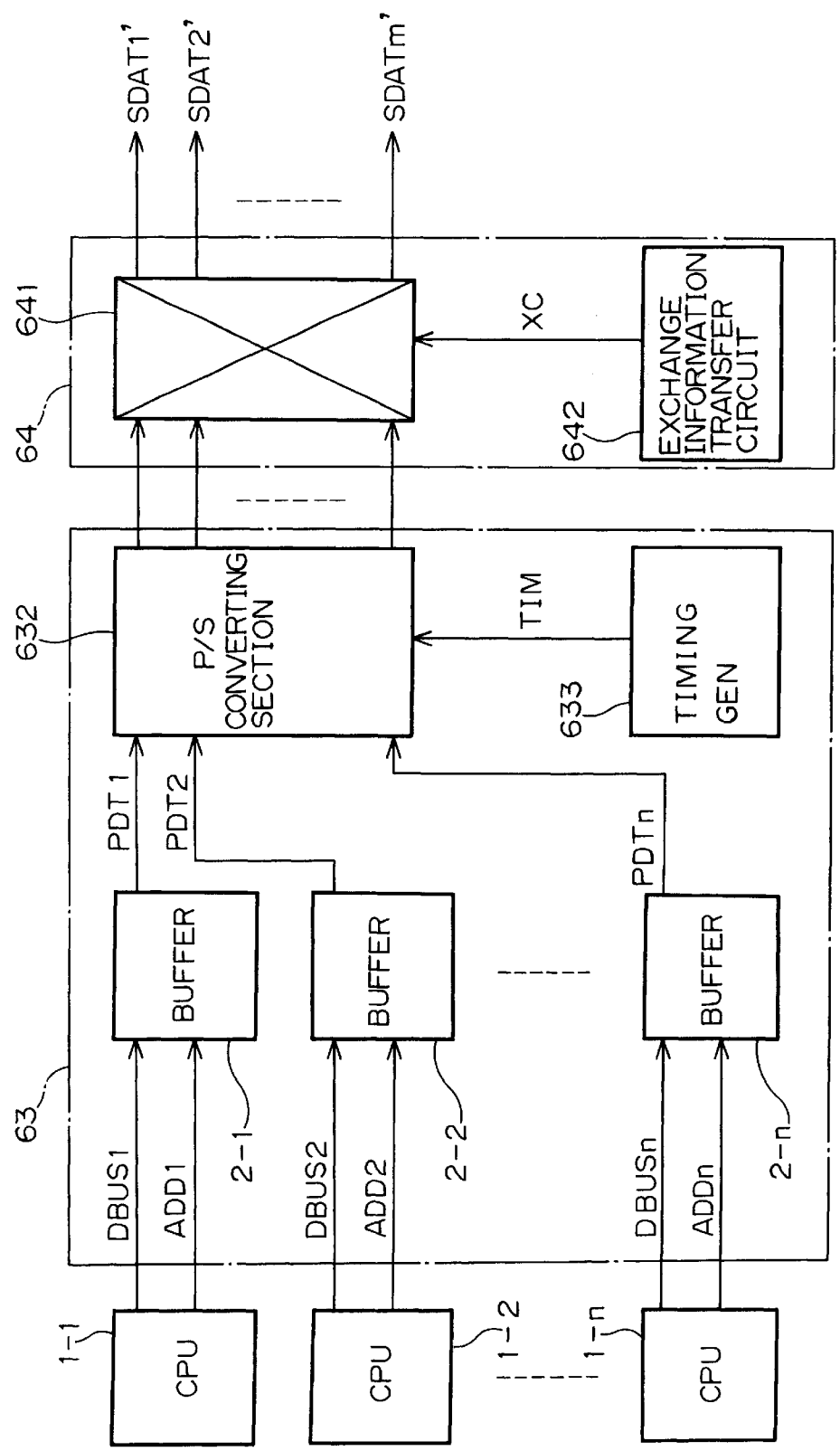
FIG. 6 is a block diagram of a second conventional data exchange system.
Figure 7:
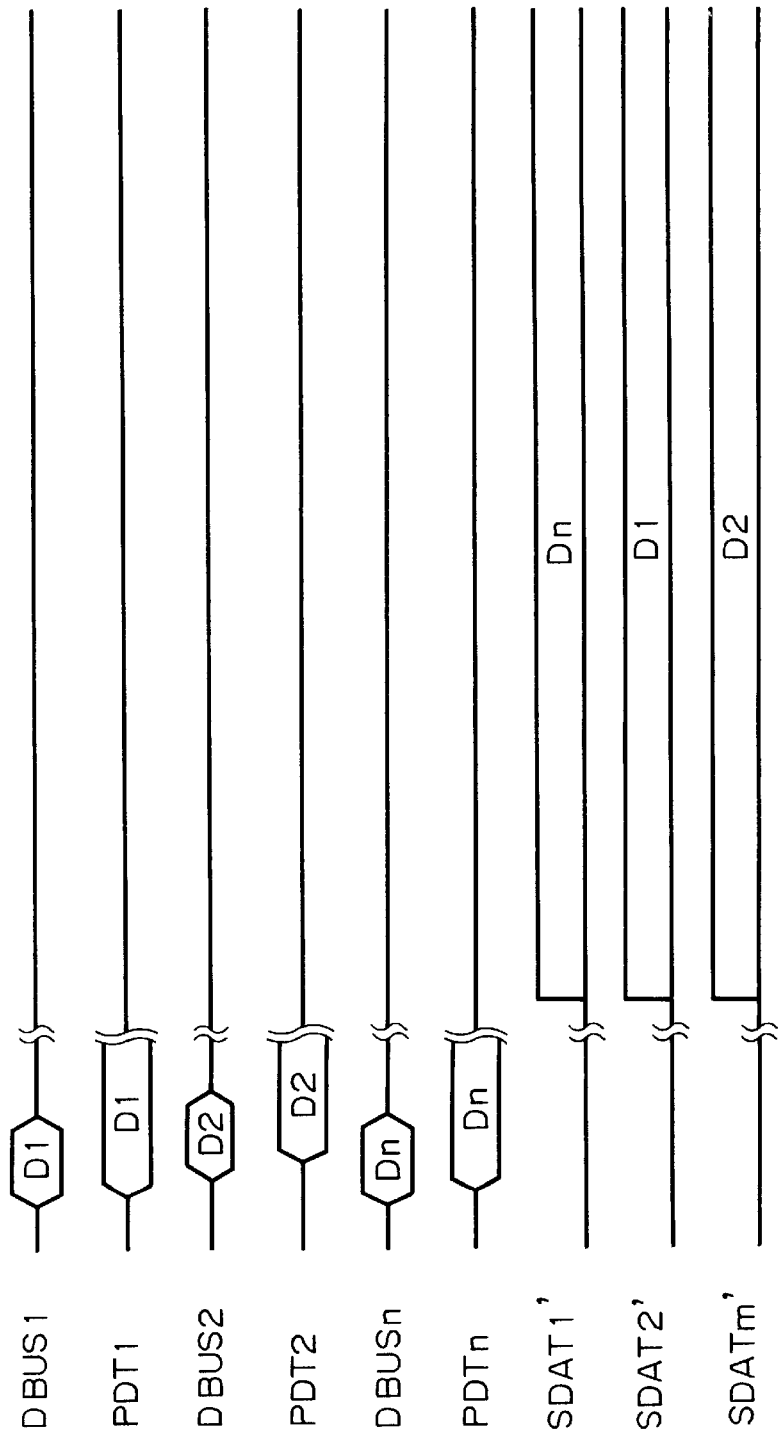
FIG. 7 is a time chart illustrating an operation of the second conventional data exchange system illustrated in FIG. 6.
Figure 8:
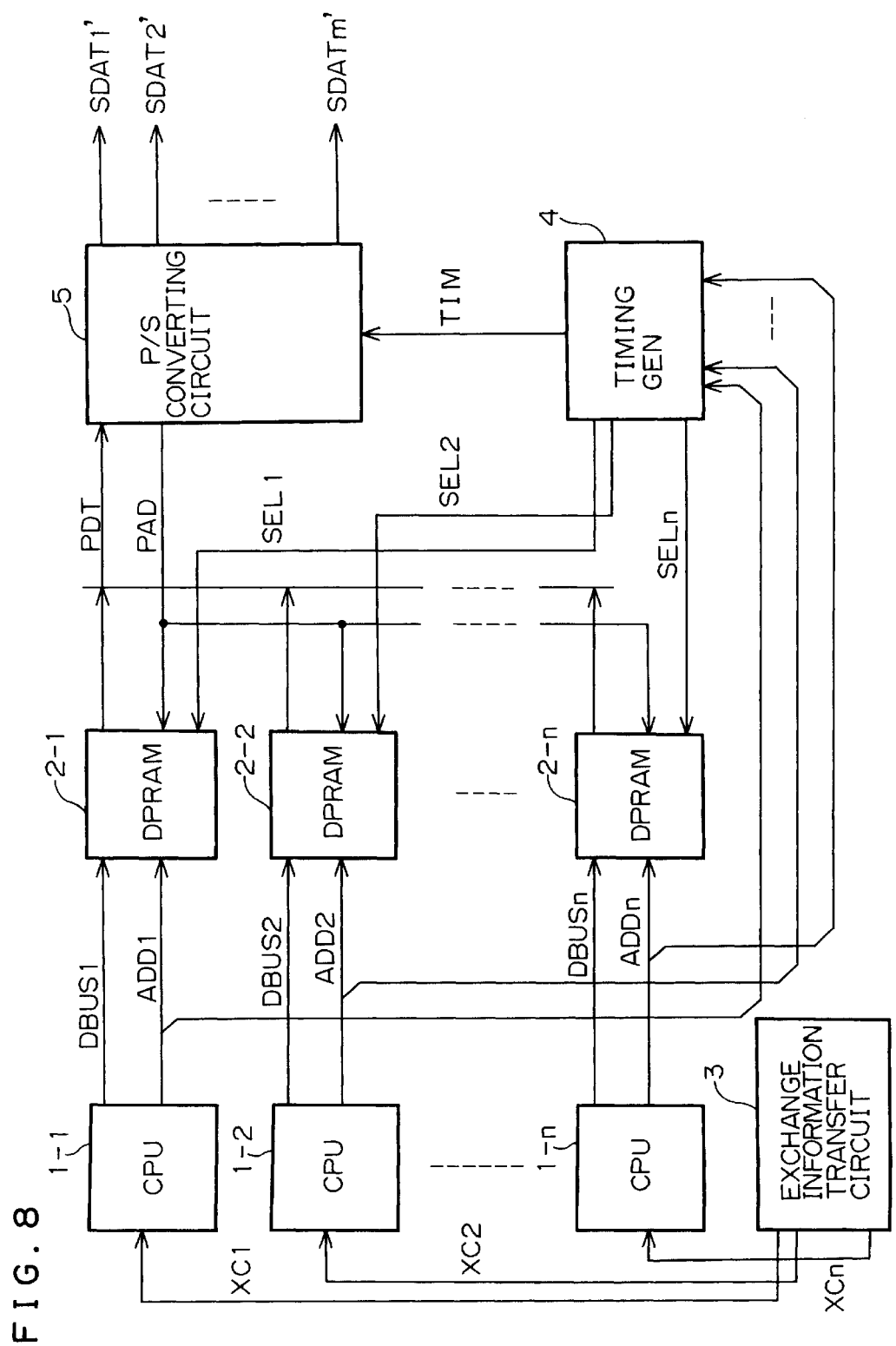
FIG. 8 is a block diagram of a data exchange system in accordance with the preferred embodiment of the present invention.

FIG. 8 illustrates a data exchange system in accordance with the embodiment of the present invention. Parts or elements corresponding to those in FIGS. 1 to 7 have been provided with the same reference numerals.

The illustrated data exchange system includes the n number of CPUs 1-1 to 1-n, dual port RAMs 2-1 to 2-n in the same number as the number of CPUs so that the dual port RAMs 2-1 to 2-n are associated with the CPUs one to one, an exchange information transfer circuit 3 for transmitting exchange information XC1 to XCn to each one of the CPUs 1-1 to 1-n, a timing pulse generating circuit 4 which receives address buses ADD1 to ADDn from the CPUs 1-1 to 1-n, and transmits selection signals SEL1 to SELn to the dual port RAMs 2-1 to 2-n to thereby designate an area into which data is to be written, and a parallel/serial (P/S) converting circuit 5.

Each of the dual port RAMs 2-1 to 2-n stores data transmitted from an associated CPU 1-1 to 1-n through an associated data bus DBUS1 to DBUSn. The P/S converting circuit 5 receives parallel data PDT from all of the dual port RAMs 2-1 to 2-n, and converts the received parallel data PDT into serial data SDAT1' to SDATm'.

The data exchange system in accordance with the embodiment is different from the conventional data exchange system in that the line exchange circuit 64 (see FIG. 3) is eliminated, that the exchange information XC1 to XCn is transmitted to each of the CPUs 1-1 to 1-n, that each one of the dual port RAMs 2-1 to 2-n is in association with each one of CPUs 1-1 to 1-n, and that the timing generating circuit 4 transmits the selection signals SEL1 to SELn to each one of the dual port RAMs 2-1 to 2-n to thereby control the dual port RAMs 2-1 to 2-n in operation.

That is, the data exchange system has the following structure in order to avoid the system from being increased in size.

(a) The data exchange system is designed to have a dual port RAM in association with each one of CPUs for storing therein data processed by CPU.

(b) A line exchange circuit is eliminated, and instead, exchange information is transferred to each one of CPUs.

(c) The timing generating circuit is designed to have a function of monitoring access from each one of CPUs to an associated dual port RAM.

(d) All the dual port RAMs are in communication at ports thereof at the side of public network with the P/S converting circuit through a common bus.

The above-mentioned structure makes it possible to eliminate a line exchange circuit which is a major factor for increasing a data exchange system in size. In addition, the number of communication signals or the number of addresses between the dual port RAMs and the P/S converting circuit is reduced by using a common bus connecting them with each other.

Figure 9:
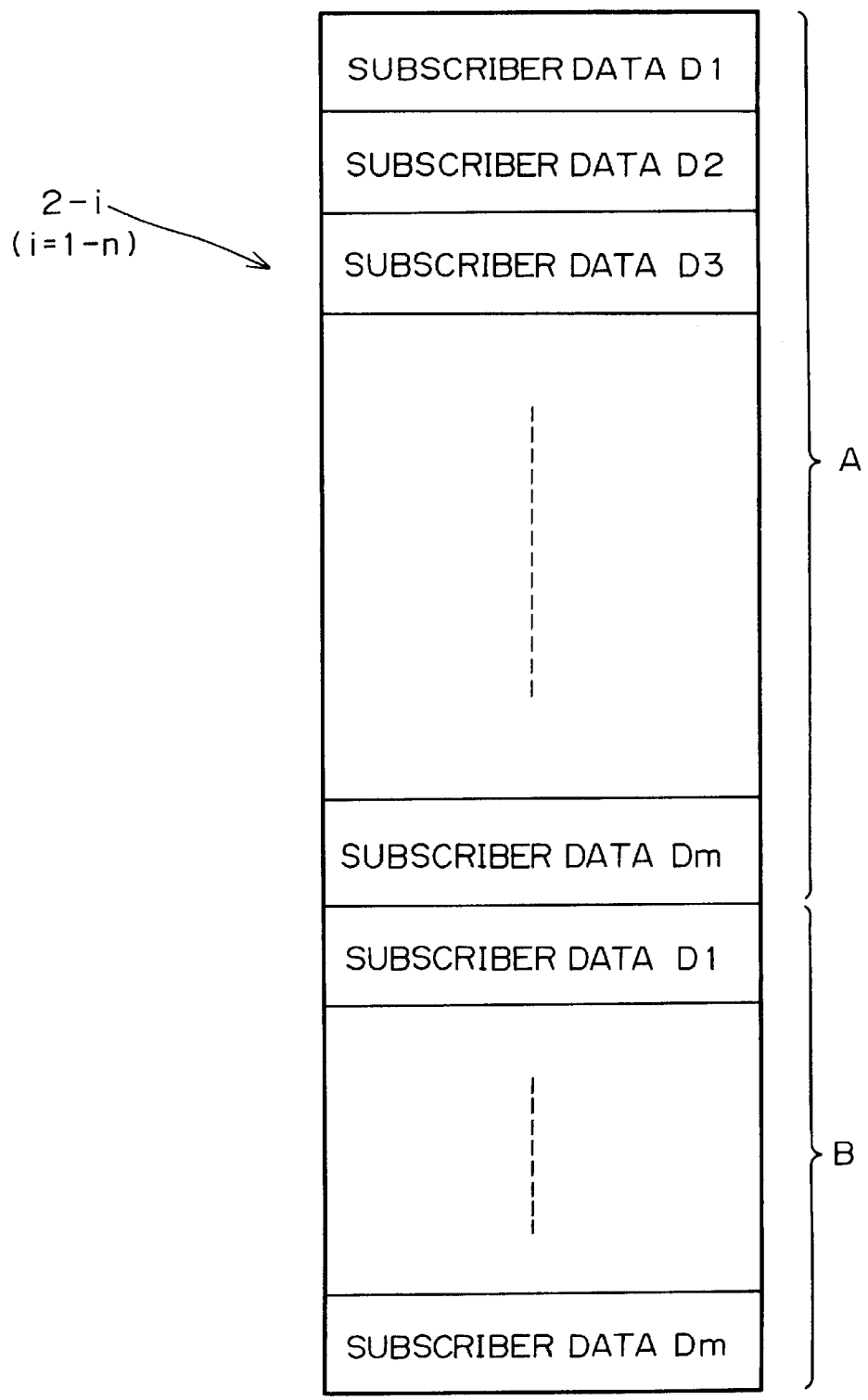
FIG. 9 illustrates a structure of the dual port RAM illustrated in FIG. 8.

As illustrated in FIG. 9, each of dual port RAMs 2-1 to 2-n is designed to have an internal area divided into two sections A and B. Each of the sections A and B is further divided into the m number of areas, corresponding to the m number of lines, in order to store subscribers' data D1 to Dm in each one of the divided areas. The sections A and B are alternately used.

Though the internal area of each one of dual port RAMs 2-1 to 2-n is divided into two sections, the number by which the internal area is divided into sections is not to be limited to two. Each one of dual port RAMs 2-1 to 2-n may be designed to have R storage sections where R is a positive integer equal to or greater than 3, in which case, R storage sections are selected one by one as an area in which data is to be stored.

The exchange information transfer circuit 3 is designed to in advance receive the exchange information XC1 to XCn in the form of matrix table from an upstream system (not illustrated), and transmit the exchange information XC1 to XCn to each one of the CPUs 1-1 to 1-n. Each one of the CPUs 1-1 to 1-n stores the processed data into an area designated by the exchange information XC1 to XCn among the m number of the areas in each of the sections A and B in each one of dual port RAMs 2-1 to 2-n.

The timing generating circuit 4 monitors at a certain interval addresses to which each one of the CPUs 1-1 to 1-n made access, and stores at the interval which CPU made access to which area in an associated dual port RAM. Then, the timing generating circuit 4 transmits the selection signal SEL1 to SELn to one of the dual port RAMs 2-1 to 2-n at a next internal in accordance with the monitoring result.

The P/S converting circuit 5 transmits an address PAD to one of the dual port RAMs 2-1 to 2-n in synchronization with the timing signals TIM transmitted from the timing generating circuit 4, and reads the parallel data out of the dual port RAM to which the address PAD was transmitted. Then, the P/S converting circuit 5 converts the thus read-out parallel data into serial data, and successively outputs the thus converted serial data.

It is possible to line-exchange subscribers' data and transmit the thus line-exchanged data to public network by the above-mentioned operation, even if the line exchange circuit 64 (see FIG. 3) was eliminated.

In the data exchange system illustrated in FIG. 8, data transferred from an upstream system (not illustrated) is processed in the n number of CPUs 1-1 to 1-n for every one of the m number of lines (m=n×L). The thus processed data is transmitted to and stored in the designated area among the m number of areas in an associated dual port RAM 2-1 to 2-n through both an associated data bus DBUS1 to DBUSn and an associated address bus ADD1 to ADDn in accordance with the exchange information XC1 to XCn having been in advance transmitted from the exchange information transfer circuit 3.

The timing generating circuit 4 monitors at a certain interval which area each one of the CPUs 1-1 to 1-n made access to, and transmits the selection signal SEL1 to SELn to each one of the dual port RAMs 2-1 to 2-n. The P/S converting circuit 5 selects the area among the m number of areas, from which data is to be read out, based on the received selection signal SEL1 to SELn. Then, the P/S converting circuit 5 transmits the address PAD to one of the dual port RAMs 2-1 to 2-n to which the selection signal SEL1 to SELn has been transmitted, in synchronization with the timing signal TIM transmitted from the timing generating circuit 4, to thereby read out the parallel data PDT from the selected dual port RAM. The thus read-out m number of parallel data PDT is converted into the m number of serial data in the P/S converting circuit 5, and then output as the line-exchanged serial data SDAT1' to SDATm'.

Figure 10:
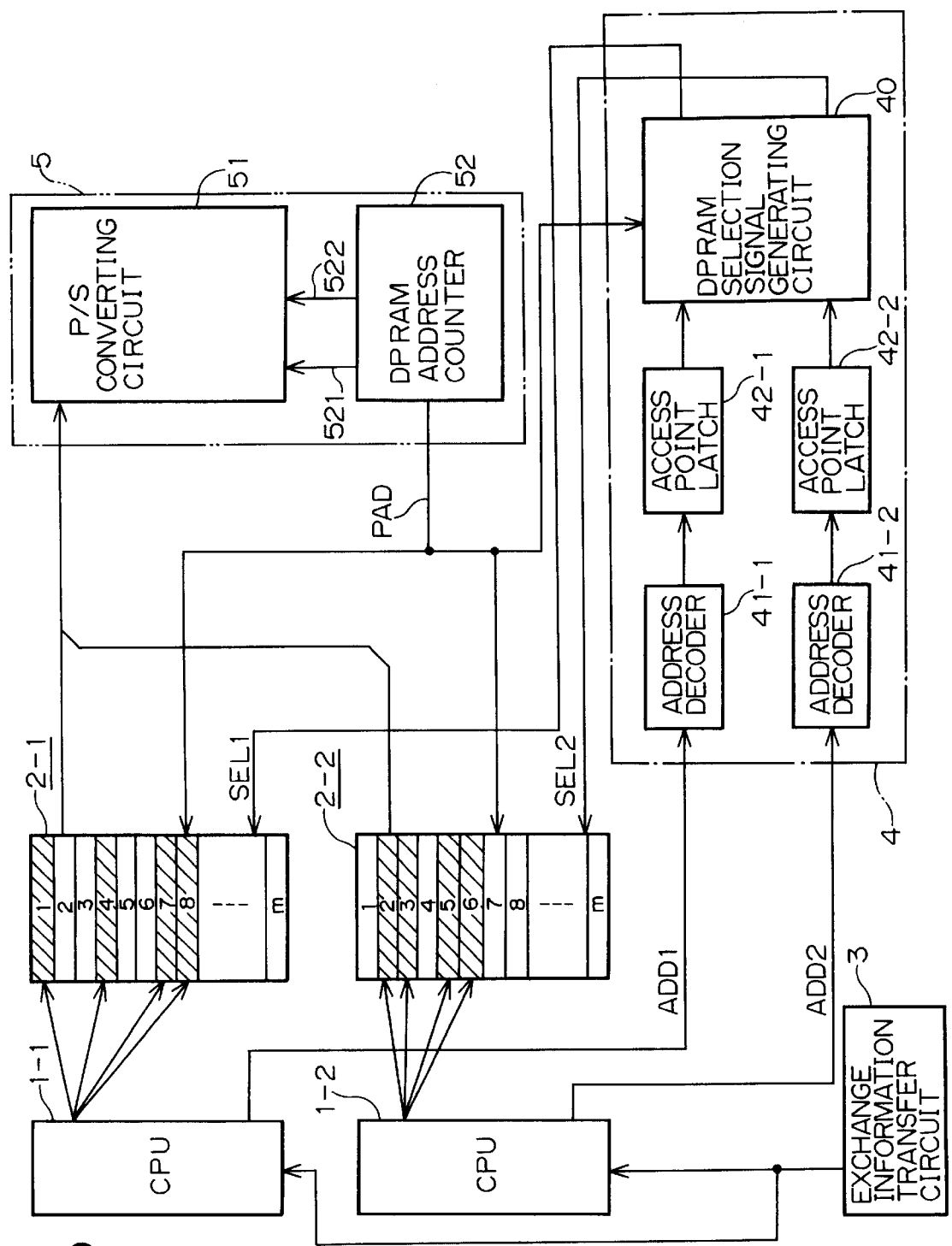
FIG. 10 is a block diagram of a data exchange system as an example of the preferred embodiment.

Referring to FIG. 10, hereinbelow is explained a detailed example of a data exchange system wherein n is equal to two, namely, a data exchange system is designed to have two CPUs 1-1 and 1-2, and two dual port RAMs 2-1 and 2-2. In FIG. 10, parts or elements corresponding to those of FIGS. 8 and 1 have been provided with the same reference numerals. As illustrated in FIG. 10, CPU 1-1 is in association with the dual port RAM 2-1, and CPU 1-2 is in association with the dual port RAM 2-2.

As mentioned earlier, each one of the dual port RAMs 2-1 and 2-2 is designed to have the storage sections A and B each of which is divided into the m number of storage areas. In FIG. 10, only one of the storage sections A and B is illustrated. Now suppose that data is to be written into the storage areas Nos. 1, 4, 7 and 8 (hatched areas) in the dual port RAM 2-1, and data is to be written into the storage areas Nos. 2, 3, 5 and 6 (hatched areas) in the dual port RAM 2-2.

The timing generating circuit 4 includes an address decoder 41-1 for decoding an address to which CPU 1-1 made access, an access point latch for 42-1 for storing therein a result of decoding made by the address decoder 41-1, an address decoder 41-2 for decoding an address to which CPU 1-2 made access to, an access point latch for 42-2 for storing therein a result of decoding made by the address decoder 41-2, and a dual port RAM selection signal generating circuit 40 for transmitting a selection signal SEL1 to the dual port RAM 2-1 or a selection signal SEL2 to the dual port RAM 2-2 in dependence on what is stored in the access point latches 42-1 and 42-2.

The P/S converting circuit 5 is designed to include a P/S conversion circuit 51 for converting parallel data read out of each one of the dual port RAMs 2-1 and 2-2, into serial data, and a dual port RAM address counter 52 for transmitting a data load pulse 521 and a P/S load pulse 522 to the P/S conversion circuit 51, and for transmitting the parallel address PAD to one of the dual port RAMs 2-1 and 2-2.

The exchange information transfer circuit 3 receives exchange information from an upstream system (not illustrated), and transmits the thus received exchange information to CPU 1-1 and CPU 1-2. In this example, the data processed by CPU 1-1 is written into an area indicated by the exchange information among the areas Nos. 1, 4, 7 and 8 in the dual port RAM 2-1. Similarly, the data processed by CPU 1-2 is written into an area indicated by the exchange information among the areas Nos. 2, 3, 5 and 6 in the dual port RAM 2-2.

Figure 11:
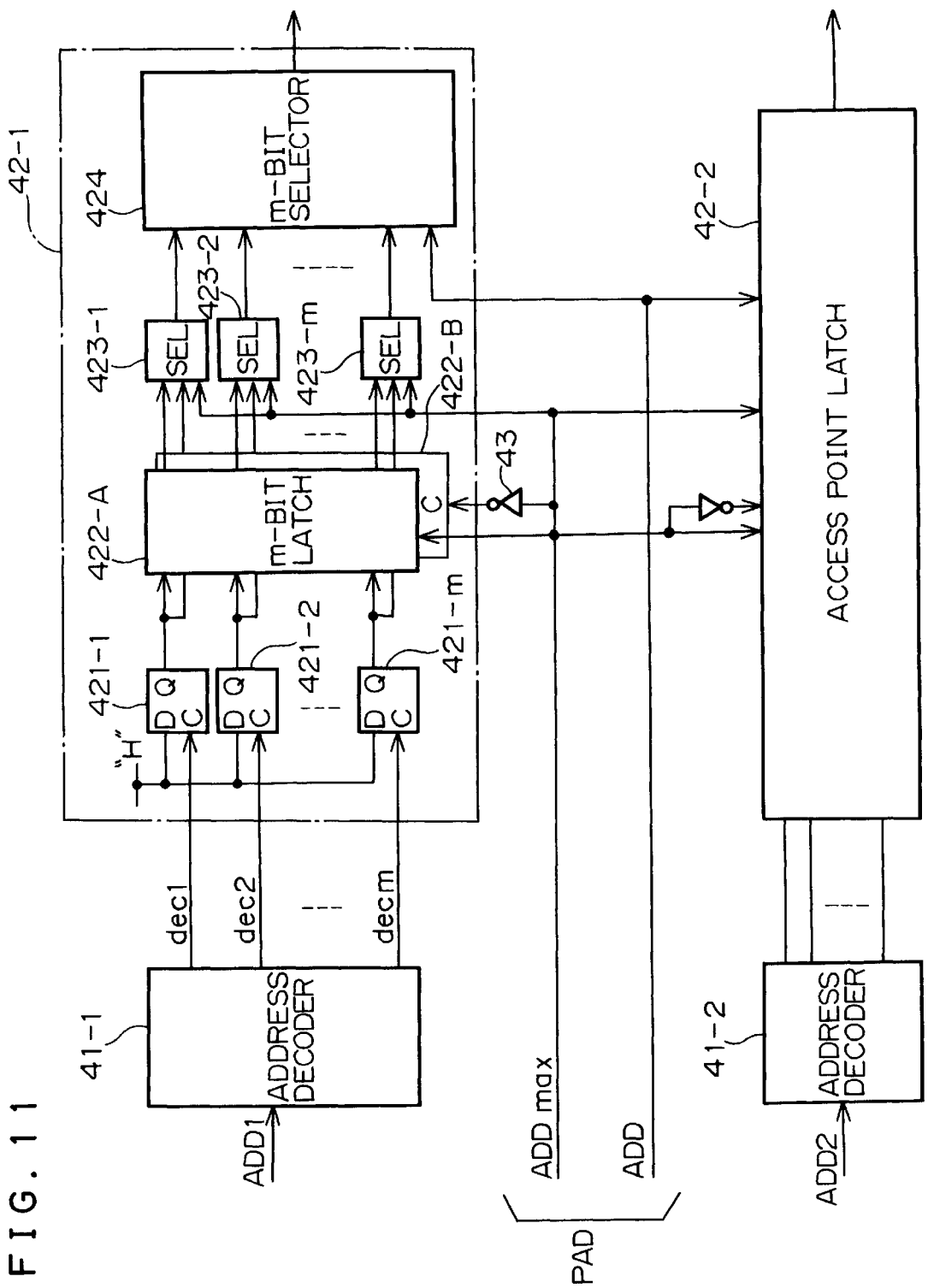
FIG. 11 is a block diagram of an access point latch of a timing generating circuit illustrated in FIG. 10.

The structure of the access point latch 42-1 or 42-2 illustrated in FIG. 10 is explained hereinbelow with reference to FIG. 11. As illustrated in FIG. 11, the access point latch 42-1 includes the m number of flip-flops 421-1 to 421-m each of which has a clock input terminal at which one of decode outputs dec 1 to dec m transmitted from the address decoder 41-1 is received, D input terminal fixed at a high level, and Q output terminal for transmitting an output in accordance with the decode output received at the clock input terminal, two m-bit latches 422-A and 422-B for latching the outputs transmitted from the flip-flops 421-1 to 421-m, the m number of selectors 423-1 to 423-m receiving outputs transmitted from the m-bit latches 422-A and 422-B, and a m-bit selector 424 for latching outputs transmitted from the selectors 423-1 to 423-m. The m-bit latches 422-A and 422-B corresponds to the storage sections A and B of each one of the dual port RAMs 2-1 to 2-n.

A bit ADDmax which is an uppermost grade bit in an address to the dual port RAMs is input into the m-bit latch 422-A and 422B as a clock for switching the storage section A to the storage section B, and vice versa. A bit ADDmax which is an uppermost grade bit in the parallel address PAD transmitted from the dual port RAM address counter 52 is inverted by an inverter 43, and the thus inverted bit ADDmax is input into the m-bit latch 422-B associated with the section B. In this way, the m-bit latch 422-A or 422-B is alternately used in accordance with a sign of the uppermost grade bit ADDmax. Addresses ADD except the uppermost grade bit ADDmax are input into the m-bit selector 424 as selection signals.

The access point latch 42-2 has the same structure as that of the access point latch 42-1 except that the access point latch 42-2 receives decode results transmitted from the address decoder 41-2.

Figure 12:
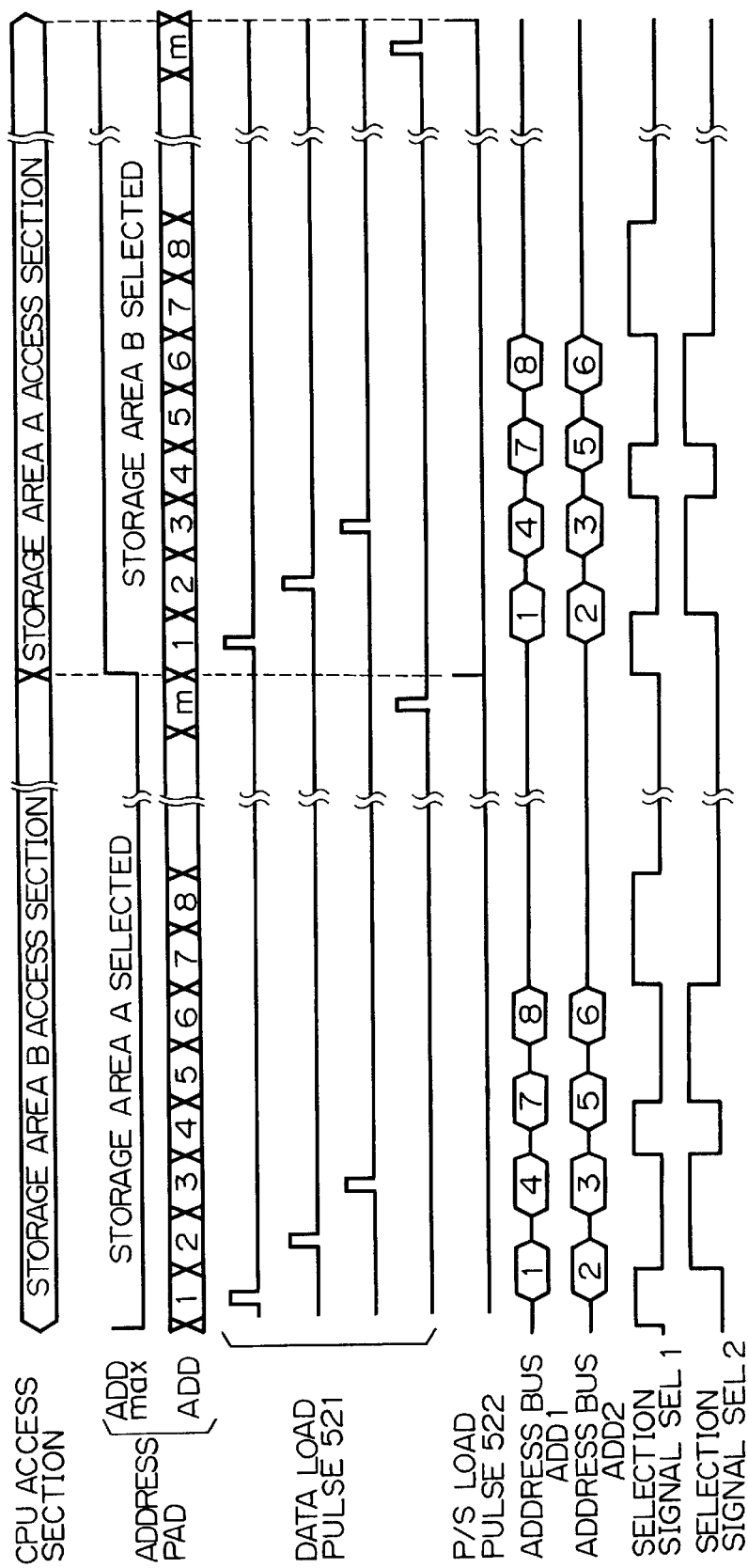
FIG. 12 is a time chart illustrating an operation of the data exchange system illustrated in FIG. 10.

Referring back to FIG. 10, an operation of the data exchange system having the above-mentioned structure is explained with reference also to FIG. 12. In FIG. 12, elements or parts corresponding to those of FIG. 10 have been provided with the same reference numerals. FIG. 12 illustrates an uppermost grade bit ADDmax in an address, addresses ADD except the uppermost grade bit ADDmax, the data load pulse 521 and the P/S load pulse 522 both transmitted from the dual port RAM address counter 52, addresses on each of the address buses ADD1 and ADD 2, and the selection signals SEL 1 and SEL 2 both transmitted from the timing generating circuit 4. The selection signals SEL 1 and SEL 2 indicate selected condition when in a high level, and non-selected condition when in a low level.

As illustrated in FIG. 12, in a duration where CPUs 1-1 and 1-2 make access to the storage section B in the dual port RAMs 2-1 and 2-2 to thereby write data into the dual port RAMs 2-1 and 2-2 through the serial ports, the parallel address PAD transmitted from the dual port RAM address counter 52 is input into the dual port RAMs 2-1 and 2-2, and data is read out of the storage section A of the dual port RAMs 2-1 and 2-2 through the parallel ports in accordance with the sign of the uppermost grade bit ADDmax in the address. On the contrary, in a duration where CPUs 1-1 and 1-2 make access to the storage section A in the dual port RAMs 2-1 and 2-2 to thereby write data into the dual port RAMs 2-1 and 2-2 through the serial ports, the parallel address PAD transmitted from the dual port RAM address counter 52 is input into the dual port RAMs 2-1 and 2-2, and data is read out of the storage section B of the dual port RAMs 2-1 and 2-2 through the parallel ports in accordance with the sign of the uppermost grade bit ADDmax in the address.

The address ADD except the uppermost grade bit ADDmax is successively varied from 1 to m one by one. The thus varied address ADD together with the data load pulse 521 is input into the P/S converting circuit 51. In addition, the P/S load pulse 522 is further input into the P/S converting circuit 51 at a timing at which the storage section to which CPUs 1-1 and 1-2 make access is switched. As a result, the selection signals SEL 1 and SEL 2 transmitted to the dual port RAMs 2-1 and 2-2 are varied in such a manner as illustrated in FIG. 12, and thus, only the hatched areas Nos. 1, 4, 7 and 8 (see FIG. 10) in the dual port RAM 2-1 or Nos. 2, 3, 5 and 6 in the dual port RAM 2-2 are selected.

Since the addresses and signals are transmitted in a manner as mentioned above, the parallel data is input into the P/S converting circuit 5 from the dual port RAMs 2-1 and 2-2, and then, is converted into serial data, which is then output.

As having been explained so far, the data exchange system in accordance with the embodiment eliminates a line exchange circuit and a bus arbitrating circuit both of which were absolutely necessary for operation in conventional data exchange systems. Instead, the data exchange system is designed to have memories in association with each one of the control circuits or CPUs, and carries out line-exchange by designating an area into which data is to be written, in accordance with exchange information, and writing data into the thus designated area. This makes it possible to prevent the data exchange system from being increased in size, even if the line number was increased.

In addition, each one of the dual port RAMs as memories is designed to have two storage sections for storing data therein. The two storage sections are alternately used for writing data thereinto or reading out data thereof. This enhances an efficiency in line exchange.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 9-74860 filed on Mar. 27, 1997 including specification, claims, drawings and summary is incorporated herein by reference in its entirety.

What is claimed is:

1. A data exchange system for delivering incoming data to a destination, the system comprising:
   a plurality of control circuits, each operative to receive incoming data;
   a plurality of memories each of which is operable to store data transmitted from an associated control circuit, each memory being comprised of a plurality of locations, with each location being preset to store data destined for one of a plurality of possible data destinations;
   an addressing circuit which designates locations in said plurality of memories in which transmitted data is to be written according to the intended destination thereof and transmits selection signals to memories for monitoring access from said control circuits to said memories; and
   a reader for reading out data written in said designated locations in said memories for delivery to the corresponding destination.

2. The data exchange system as set forth in claim 1, wherein each one of said memories has first and second storage areas, and wherein said addressing circuit alternately designates said first and second storage areas as an area in which transmitted data is to be written.

3. The data exchange system as set forth in claim 2, wherein each of said first and second storage areas comprises a plurality of locations.

4. The data exchange system as set forth in claim 1, wherein each one of said memories has R storage areas where R is a positive integer equal to or greater than 2, and wherein said addressing circuit designates said R storage areas in succession as an area in which transmitted data is to be written.

5. The data exchange system as set forth in claim 4, wherein each of said R storage areas comprises a plurality of locations.

6. The data exchange system as set forth in claim 1, wherein each one of said memories comprises a dual port random access memory (RAM) having first and second ports, wherein data transmitted from said control circuits is written into said memories through said first port, and wherein the data is read out by said reader through said second port.

7. The data exchange system as set forth in claim 6, wherein said first port is a serial port, and said second port is a parallel port.

8. The data exchange system as set forth in claim 1, wherein each one of said control circuit comprises a central processing unit (CPU).

9. The data exchange system as set forth in claim 1, further comprising an exchange information transfer circuit for transmitting exchange information to each one of said control circuits, said data being written into a location in an associated memory in accordance with said exchange information.

10. A data exchange system for delivering incoming data to a destination, the system comprising:
    a plurality of control circuits, each operative to receive incoming data;
    a plurality of memories each of which is operable to store data transmitted from an associated control circuit, each memory being comprised of a plurality of locations, each corresponding to one of a plurality of possible data destinations;
    an addressing circuit which designates locations in said plurality of memories in which transmitted data is to be written; and a reader for reading out data written in said designated locations in said memories for delivery to the corresponding destination, wherein said addressing circuit transmits selection signals to said memories to thereby monitor access from said control circuits to said memories.

11. The data exchange system as set forth in claim 1, wherein said reader includes a parallel/serial converting circuit for converting parallel data transmitted from said memories to serial data.

12. A data exchange system for delivering incoming data to a destination, the system comprising:

a plurality of control circuits, each operative to receive incoming data;

a plurality of memories each of which is operable to store data transmitted from an associated control circuit, each memory being comprised of a plurality of locations, each corresponding to one of a plurality of possible data destinations;

an addressing circuit which designates locations in said plurality of memories in which transmitted data is to be written; and a reader for reading out data written in said designated locations in said memories for delivery to the corresponding destination, said reader including a parallel/serial converting circuit for converting parallel data transmitted from said memories to serial data; and an address counter for transmitting a load pulse to said parallel serial converting circuit and an address to said memories.

13. The data exchange system as set forth in claim 11, wherein all of said memories are in communication with said parallel/serial converting circuit through a common bus.

14. A data exchange system for delivering incoming data to a destination, the system comprising:

a plurality of control circuits, each operative to receive incoming data;

a plurality of memories each of which is operable to store data transmitted from an associated control circuit, each memory being comprised of a plurality of locations, each corresponding to one of a plurality of possible data destinations;

an addressing circuit which designates locations in said plurality of memories in which transmitted data is to be written; and a reader for reading out data written in said designated locations in said memories for delivery to the corresponding destination, wherein each of said memories has first and second storage areas, alternately designated by said addressing circuit as an area in which transmitted data is to be written; and wherein said addressing circuit monitors at a certain interval which one of said first and second storage areas of said memories each of said control circuits makes access to, and transmits selection signals based on monitoring results so that said reader can read out said data written in one of said first and second storage areas.

15. A data exchange system for delivering incoming data to a destination, the system comprising:

a plurality of control circuits, each operative to receive incoming data;

a plurality of memories each of which is operable to store data transmitted from an associated control circuit, each memory being comprised of a plurality of locations, each corresponding to one of a plurality of possible data destinations;

an addressing circuit which designates locations in said plurality of memories in which transmitted data is to be written; and a reader for reading out data written in said designated locations in said memories for delivery to the corresponding destination, and wherein said addressing circuit includes:

address decoders in the same number of said control circuits, each of said address decoders decoding an address an associated control circuit made access to;

access point latches in association with said address decoders, each of said access point latches storing therein a result of decoding made by an associated address decoder; and a selection signal generating circuit for transmitting selection signals to said memories, based on said result stored in each one of said access point latches.

16. The data exchange system as set forth in claim 15, wherein each of said access point latches includes:

at least one flip-flop having a first input terminal fixed at a high level, a second input terminal receiving a decode output transmitted from an associated address decoder, and an output terminal for transmitting an output in accordance with said decode output;

a plurality of bit latches for latching said output transmitted from said flip-flop;

at least one selector receiving outputs transmitted from said bit latches and transmitting a single output; and a bit selector for latching said output transmitted from said selector.

17. The data exchange system as set forth in claim 16, wherein said access point latches includes said bit latches in the same number as the number of areas into which each one of said memories is divided.

18. The data exchange system as set forth in claim 16, wherein said number is two.

19. The data exchange system as set forth in claim 18, further comprising an inverter for inverting a signal, and wherein a first bit latch is activated when receiving signal, and a second bit latch is activated when receiving an inverted signal inverted by said inverter.

20. A data exchange system comprising:

a plurality of control circuits;

a plurality of memories each of which stores data transmitted from an associated control circuit;

an exchange information transfer circuit for transmitting exchange information to each one of said control circuits;

a timing pulse generating circuit for providing each of said memories a designation about an area into which said data is to be written; and a reading circuit for reading out data written in the thus designated area in said associated memory.

21. The data exchange system as set forth in claim 20, wherein said data exchange system includes said memories in the same number as that of said control circuits in such a manner that said memories are associated with said control circuits one to one.

22. The data exchange system as set forth in claim 20, wherein each one of said memories has first and second storage areas, and wherein said timing pulse generating circuit alternately designates said first and second storage areas as an area in which said data is to be written.

23. The data exchange system as set forth in claim 22, wherein each of said first and second storage areas comprises a plurality of sections.

24. The data exchange system as set forth in claim 23, wherein each of said first and second storage areas has said sections in the same number as the number of lines to which said data transmitted from said control circuits is to be transmitted.

25. The data exchange system as set forth in claim 20, wherein each one of said memories has R storage areas where R is a positive integer equal to or greater than 2, and wherein said timing pulse generating circuit designates said R storage areas one by one as an area in which said data is to be written.

26. The data exchange system as set forth in claim 25, wherein each of said R storage areas comprises a plurality of sections.

27. The data exchange system as set forth in claim 26, wherein each of said R storage areas has said sections in the same number as the number of lines to which said data transmitted from said control circuits is to be transmitted.

28. The data exchange system as set forth in claim 20, wherein each one of said memories comprises a dual port random access memory (RAM) having first and second ports, data transmitted from said control circuits being written into said memories through said first port and the thus written-into data being read out by said reading circuit through said second port.

29. The data exchange system as set forth in claim 28, wherein said first port is a serial port, and said second port is a parallel port.

30. The data exchange system as set forth in claim 20, wherein each one of said control circuits comprises a central processing unit (CPU).

31. The data exchange system as set forth in claim 20, wherein said timing pulse generating circuit transmits selection signals to said memories to thereby monitor access from said control circuits to said memories.

32. The data exchange system as set forth in claim 20, wherein said reading circuit includes a conversion circuit for converting parallel data transmitted form said memories to serial data.

33. The data exchange system as set forth in claim 32, wherein said reading circuit further includes an address counter for transmitting a load pulse to said conversion circuit and an address to said memories.

34. The data exchange system as set forth in claim 32, wherein all of said memories are in communication with said parallel/serial converting circuit through a common bus.

35. The data exchange system as set forth in claim 22, wherein said timing pulse generating circuit monitors at a certain interval which one of said first and second storage areas of said memories each of said control circuits makes access to, and transmits selection signals based on monitoring results so that said reading circuit can read out said data written in one of said first and second storage areas.

36. The data exchange system as set forth in claim 20, wherein said timing pulse generating circuit includes:
    (a) address decoders in the same number of said control circuits, each of said address decoders decoding an address an associated control circuit made access to;
    (b) access point latches in association with said address decoders, each of said access point latches storing therein a result of decoding made by an associated address decoder; and
    (c) a selection signal generating circuit for transmitting selection signals to said memories, based on said result stored in each one of said access point latches.

37. The data exchange system as set forth in claim 36, wherein each of said access point latches includes:
    (a) at least one flip-flop having a first input terminal fixed at a high level, a second input terminal receiving a decode output transmitted from an associated address decoder, and an output terminal for transmitting an output in accordance with said decode output;
    (b) a plurality of bit latches for latching said output transmitted from said-flip-flop;
    (c) at least one selector receiving outputs transmitted from said bit latches and transmitting a single output; and
    (d) a bit selector for latching said output transmitted from said selector.

38. The data exchange system as set forth in claim 37, wherein said access point latches includes said bit latches in the same number as the number of areas into which each one of said memories is divided.

39. The data exchange system as set forth in claim 37, wherein said number is two.

40. The data exchange system as set forth in claim 39, further comprising an inverter for inverting a signal, and wherein a first bit latch is activated when receiving a signal, and a second bit latch is activated when receiving an inverted signal inverted by said inverter.

41. The data exchange system as described in claim 1, wherein the number of control circuits is equal to the number of memories.

42. A data exchange system as described in claim 3, wherein the number of locations in each of said storage areas is equal to the number of possible destinations for the incoming data.

43. A data exchange system as described in claim 5, wherein the number of locations in each of said R storage areas is equal to the number of possible destinations for the incoming data.

44. A method of exchanging data between one of a plurality of data sources and a selected one of a plurality of data destinations, the method comprising:
    coupling data from a data source to a selected one of a plurality of control circuits;
    associating a memory device with the selected control circuit;
    designating a portion of the associated memory device into which data is to be written from the selected control circuit;
    transmitting data from the selected control circuit to the designated portion of the associated memory device;
    reading the stored data from the designated portion of the associated memory device; and
    delivering the read data to the intended destination.

45. A method of data exchange as described in claim 44, wherein the portion of the associated memory device into which data is to be written from the selected control circuit is designated according to the intended destination of the data.

46. A method of data exchange as described in claim 44, further including:
    providing exchange information to each of the control circuits according to the intended destination of the data coupled thereto; and
    designating the portion of the associated memory device into which data is to be written from the selected control circuit according to the exchange information.

47. A method of data exchange as described in claim 44, wherein the portion of a memory device into which data is to be written is designated by:

processing exchange information associated with incoming data to generate a memory access address;

storing the memory access address; and activating a portion of the memory device according to the stored memory access address.

48. The method as set forth in claim 44, wherein each one of said memory devices has first and second storage areas, and further including the step of alternately designating said first and second storage areas as an area in which transmitted data is to be written.

49. The method as set forth in claim 48, wherein each of said first and second storage areas comprises a plurality of sections, and further including the step of designating at least one of said sections in which transmitted data is to be written.

50. The method as set forth in claim 44 wherein each one of said memory devices has R storage areas where R is a positive integer equal to or greater than 2, and further including the step of designating R storage areas one by one as an area in which transmitted data is to be written.

51. The method as set forth in claim 50, wherein each of said R storage areas comprises a plurality of sections, and further including the step of designating at least one of said sections in which transmitted data is to be written.

52. The method as set forth in claim 44, further comprising the step of monitoring access from said control circuits to said memory devices.

53. The method as set forth in claim 44, further comprising the step of converting parallel data transmitted from said memory devices to serial data.

54. The method as set forth in claim 53, wherein said parallel data is transmitted form all of said memory devices through a common bus.

55. The method as set forth in claim 48, further comprising the steps of:

monitoring at a certain interval which one of said first and second storage areas of said memory devices each of said control circuits makes access to, and transmitting selection signals based on monitoring results so that said data written in one of said first and second storage areas can be read out.

56. The method as set forth in claim 48, wherein said first storage area is selected by receiving a first signal, and said second storage area is selected by receiving a second signal which is an inverted signal of said first signal.

57. A data exchange system for transferring incoming data from a plurality of communication devices to one of a plurality of available destinations indicated by destination information associated with the incoming data, the data exchange system comprising:

a plurality of control circuits, each of which receives incoming data from an associated communication device;

a plurality of memory devices, each of which is operative to store data transmitted by an associated control circuit, each memory device being comprised of a plurality of memory locations, each location being allocated for storage of data destined for one of the available destinations;

an addressing circuit which designates locations of the memory devices in which an addressing circuit which designates locations of the memory devices in which data is to be written by the associated control circuit in accordance with the associated destination information and transmits selection signals to memories for monitoring access from said control circuits to said memories; and an output circuit which reads data out of designated locations of the memory devices, and provides the data to a selected destination in accordance with the location of the memory in which the data is written.

58. A data exchange system as described in claim 57, wherein the incoming data is in serial form, data is stored in the memory devices in parallel form, and data is read out of the memory devices in serial form.

59. A method for transferring incoming data from a plurality of communication devices to one of a plurality of available destinations as indicated by destination information associated with the incoming data, the method comprising:

associating each of the communication devices on a permanent basis with one of a plurality of memory devices;

assigning each of a plurality of data storage locations in the memory devices respectively to one of the available data destinations;

storing incoming data from a communication device in the data storage location of the associated memory device assigned to the destination indicated by destination information associated with the incoming data;

transmitting selection signals to memories for monitoring access to said memories;

reading out data stored in a memory device; and providing the read out data to a destination device in accordance with the location of the memory from which the data is read out.

60. A data transfer method as described in claim 59, wherein the incoming data from the communication device is in serial form, data is stored in the memory devices in parallel form, and data is read out of the memory devices in serial form.

* * * * *